(12) United States Patent
Liu et al.

(10) Patent No.: US 11,415,417 B2
(45) Date of Patent: Aug. 16, 2022

(54) CAVITY OPTOMECHANICAL VIBRATORY GYROSCOPE

(71) Applicant: CHONGQING UNIVERSITY OF POSTS AND TELECOMMUNICATIONS, Chongqing (CN)

(72) Inventors: Yu Liu, Chongqing (CN); Yongle Lu, Chongqing (CN); Huihui Yang, Chongqing (CN); Ke Di, Chongqing (CN); Xinhai Zou, Chongqing (CN); Zhen Fang, Chongqing (CN); Jijun Bu, Chongqing (CN); Yong Yang, Chongqing (CN); Lele Fu, Chongqing (CN)

(73) Assignee: CHONGQING UNIVERSITY OF POSTS AND TELECOMMUNICATIONS, Chongqing (CN)

( * ) Notice: Subject to any disclaimer, the term of this patent is extended or adjusted under 35 U.S.C. 154(b) by 0 days.

(21) Appl. No.: 17/272,944

(22) PCT Filed: Sep. 25, 2020

(86) PCT No.: PCT/CN2020/117667
§ 371 (c)(1),
(2) Date: Mar. 3, 2021

(87) PCT Pub. No.: WO2021/120768
PCT Pub. Date: Jun. 24, 2021

(65) Prior Publication Data
US 2022/0113135 A1    Apr. 14, 2022

(30) Foreign Application Priority Data

Dec. 17, 2019 (CN) .......................... 201911303089.8

(51) Int. Cl.
*G01C 19/5684* (2012.01)
*G01C 19/5733* (2012.01)

(52) U.S. Cl.
CPC ..... *G01C 19/5684* (2013.01); *G01C 19/5733* (2013.01)

(58) Field of Classification Search
CPC .................................................. G01C 19/5684
See application file for complete search history.

(56) References Cited

U.S. PATENT DOCUMENTS 9,733,084 B2 *   8/2017  Salit ...................... G01C 19/66
10,823,571 B1 * 11/2020  Wu ....................... G01C 19/727
(Continued)

FOREIGN PATENT DOCUMENTS

CN    101858745 A    10/2010
CN    103411596 A    11/2013
(Continued)

OTHER PUBLICATIONS

International Search Report for PCT/CN2020/117667 dated Jan. 4, 2021, ISA/CN.
(Continued)

*Primary Examiner* — Paul M. West
*Assistant Examiner* — Mark A Shabman
(74) *Attorney, Agent, or Firm* — Yue (Robert) Xu; Apex Attorneys at Law, LLP

(57) ABSTRACT

A cavity optomechanical vibratory gyroscope pertains to technical fields of resonant optical gyroscopes and micro-optical-electro-mechanical systems. A novel cavity optomechnical Coriolis vibratory micro gyroscope is realized based on ring micro rings and the Coriolis vibration principle, and driving and detection thereof is completely different from conventional electric or magnetic means. Based on the principle of angular velocity sensitive structures in (Continued)

the conventional Coriolis vibratory gyroscopes, full-optical driving, detecting and sensing of a vibratory gyroscope are achieved using cavity optomechanical technologies, which fundamentally suppresses various noises (including thermal noise, cross interference, connection point noise and quadrature error) introduced by electric or magnetic driving. Besides, displacement (vibration) sensing information is obtained according to a linear relationship between frequency shift and light amplitude in the micro cavity optomechanical effect.

9 Claims, 1 Drawing Sheet

(56) References Cited

U.S. PATENT DOCUMENTS

| | | | |
|---|---|---|---|
| 11,237,343 B2* | 2/2022 | Goddard | C08F 2/48 |
| 11,243,077 B2* | 2/2022 | Williamson | G01C 19/5677 |
| 2003/0020918 A1* | 1/2003 | Murakowski | G01C 19/66 |
| | | | 356/460 |
| 2019/0245318 A1* | 8/2019 | LaComb | H01S 5/4043 |
| 2019/0285797 A1* | 9/2019 | Campanella | G02B 6/12002 |
| 2021/0104861 A1* | 4/2021 | Lacomb | H01S 5/1075 |

FOREIGN PATENT DOCUMENTS

| | | |
|---|---|---|
| CN | 103884327 A | 6/2014 |
| CN | 107869987 A | 4/2018 |
| CN | 108955664 A | 12/2018 |
| CN | 110440897 A | 11/2019 |
| CN | 110967001 A | 4/2020 |
| GB | 2237638 B | 2/1994 |

OTHER PUBLICATIONS

Parham P. Khial, et al. Nanophotonic optical gyroscope with reciprocal sensitivity enhancement, Nature Photonics, vol. 12, Nov. 2018, pp. 671-675.

Longhai Lei, Stress modulation using Si-based optical microring resonator, North University of China.

* cited by examiner

CAVITY OPTOMECHANICAL VIBRATORY GYROSCOPE

The present application is the U.S. national phase of International Patent Application No. PCT/CN2020/117667, titled "CAVITY OPTOMECHANICAL VIBRATORY GYROSCOPE", filed on Sep. 25, 2020, which claims the priority to Chinese Patent Application No. 201911303089.8, titled "CAVITY OPTOMECHANICAL VIBRATORY GYROSCOPE", filed on Dec. 17, 2019, with the China National Intellectual Property Administration, both of which are incorporated herein by reference in their entirety.

FIELD

The present disclosure relates to the technical field of resonant optical gyroscopes and micro-optical-electro-mechanical systems, and in particular to a novel cavity optomechanical vibratory gyroscope, including a structural design thereof and methods for driving and detecting thereof.

BACKGROUND

Gyroscope (abbreviated as gyro) is an inertial device that detects the angular velocity of a rotating object. Micro-gyro is an inertial sensor that combines the gyro technology and the micro-electro-mechanical system (MEMS) technology to measure angle or angular velocity. At present, by working principles, gyros can be divided into mechanical rotor gyroscopes, optical gyroscopes and vibratory gyroscopes. Although mechanical rotor gyroscopes and optical gyroscopes (including opticprecisional fiber gyroscopes and laser gyroscopes, etc.) can meet the requirements in terms of precision, their weak anti-overload capability, complex structure, large volume and expensive cost are not ideal for aerospace, missile guidance and other application fields. The fundamental reason for low sensitivity of traditional vibratory gyroscopes is the influence of theoretically inherent electrical and magnetic noises. This kind of noise is loud, and therefore the gyroscope must work at the mechanical resonance frequency to obtain better signal output quality. Thus, this kind of traditional device must have an ideal resonance frequency, and to obtain this ideal resonance frequency, the structural parameters must be adjusted very accurately during the packaging process, which is often limited by processing precision. In order to obtain high sensitivity in complex environments, the mechanical quality factor of the sensor must be very large, which increases the difficulty of structural design for mechanical driving and detection frequency matching. In addition, increasing the quality factor reduces the measurement bandwidth and correspondingly reduces the dynamic measurement range of the sensor.

With the continuous maturity of micromachining technology and measurement-and-control technology, the precision of micro-optical-electro-mechanical systems (MOEMS) gyroscopes continues to improve. Compared with optical fiber gyroscopes and laser gyroscopes, they have the advantages of smaller volume and lighter weight; compared with MEMS inertial devices, they have higher sensitivity, no moving parts and stronger anti-electromagnetic interference ability, and can be used in some harsh environments.

Developing highly precise and miniaturized vibratory gyroscopes, through combining advantages of various types of vibratory gyroscopes, studying key factors affecting gyroscope precision and balancing between high precision and miniaturization, has important strategic significance in promoting national economy and weaponry development of this country and improving the self-innovation ability thereof.

In 2015, Longhai LEI (Longhai LEI. Stress modulation using Si-based optical microring resonator [D]. North University of China, 2015.) developed a new type of force-sensitive MOMES sensing and detecting structure that couples the straight waveguide and micro-ring optical resonator. However, it has low sensitivity if applied on a gyro due to the planar structural design thereof. In 2018, Khial PP from Caltech (Khial, Parham P, Alexander D. White, and Ali Hajimiri. Nanophotonic optical gyroscope with reciprocal sensitivity enhancement. *Nature Photonics* 12.11 (2018): 671.) designed, according to the working principles of the Sagnac Effect, a full-integrated nanophotonic optical gyroscope, which occupies an area of only 2 mm$^2$. However, this work is only in a theoretical stage, and the required high-precision and high-cost instruments and equipment are a big challenge for civil applications in this country.

SUMMARY

Based on the principle of angular velocity sensitive structures in the conventional Coriolis vibratory gyroscopes, the present disclosure proposes a full-optical method for achieving driving, detecting and sensing of a vibratory gyroscope by using the cavity optomechanical technology, and studies a miniaturized cavity optomechanical vibratory gyroscope with high sensitivity, high precision, and high stability. The technical solutions according to the present disclosure are as follows.

A cavity optomechanical vibratory gyroscope includes: a driving micro-nano optical fiber (1), a driving ring cavity (2), a connecting structure (3), a sensitive ring cavity (4), a supporting structure (5), a base (6) and a detecting micro-nano optical fiber (7). The supporting structure (5) is provided on the base (6) and configured to connect and support the driving ring cavity (2). The driving ring cavity (2) and the sensitive ring cavity (4) are three-dimensional dual-ring resonant cavity structures and are connected with each other by the connecting structure (3), and a distance between them is adjustable through the connecting structure (3). The driving micro-nano optical fiber (1) is coupled with the driving ring cavity (2), and the detecting micro-nano optical fiber (7) is coupled with the sensitive ring cavity (4). The driving ring cavity (2) is a driving vibratory structure of the gyroscope, and the sensitive ring cavity (4) is an angular velocity sensitive vibratory structure of the gyroscope. Driving light (pump laser) is coupled into the driving ring cavity (2) through the driving micro-nano optical fiber (1), and an output of a light source is adjusted, so that an optical signal that meets a resonance condition generates a whispering gallery mode (WGM) resonance in the driving ring cavity (2). A vibration of the driving ring cavity (2) is transmitted to the sensitive ring cavity (4) through the connecting structure (3), and a to-be-detected angular velocity WZ is input along a Z-axis direction perpendicular to the sensitive ring cavity (4), so that the sensitive ring cavity (4) generates a Coriolis force along an X direction and generates a mechanical vibration along the X direction under the force. Light from the sensitive ring cavity (4) is coupled into the detecting micro-nano optical fiber (7) for optical detecting.

Further, the supporting structure (5) is triangular in consideration of mechanical stability.

Further, the driving ring cavity (2) and the sensitive ring cavity (4) are made of SiN and SiO$_2$ materials by using micro-nano processing technology, the SiN and $SiO_2$ materials grown by plasma enhanced chemical vapor deposition (PECVD).

Further, that driving light (pump laser) is coupled into the driving ring cavity (2) through the driving micro-nano fiber (1), and an output of a light source is adjusted, so that an optical signal that meets a resonance condition generates a whispering gallery mode (WGM) resonance in the driving ring cavity (2) specifically includes: first, adjusting a coupling distance between the micro-nano optical fiber (1) and the driving ring cavity (2) to achieve optimal coupling; then, coupling the pump laser into the driving ring cavity (2) through an evanescent field of the driving micro-nano optical fiber (1), and forming an optical WGM resonance in the driving ring cavity (2); finally, stimulating different mechanical vibrations of the driving ring cavity (2) by selecting different WGM resonance modes, to achieve an optomechanical effect inside the drive ring cavity to fulfill an optical driving manner of a novel optomechanical Coriolis vibratory gyroscope.

Further, the optomechanical effect inside the driving ring cavity (2) is stimulated by adjusting a wavelength of the inputted driving light, to enable the driving ring cavity (2) with a mechanical resonance along a Y direction, that is, a driving mode of the vibratory gyroscope is achieved, where a frequency of the mechanical resonance is $\omega_{dy}$.

Further, the connecting structure (3) is made of a SiN material and transmits, as a mechanical transmission structure, the mechanical resonance of the driving ring cavity (2) to the sensitive ring cavity (4), by which the sensitive ring cavity (4) generates a mechanical vibration with the same frequency $\omega_{dy}$ along the Y direction as a mechanical vibration in the driving ring cavity (2).

Further, in a case that no external angular velocity is inputted, the detecting light is coupled into the sensitive ring cavity (4) through the detecting micro-nano optical fiber (7), and a frequency of input light is selected to be lower than a resonance frequency of the sensitive ring cavity (4), in which case phonons of the sensitive ring cavity (4) transfer energy to photons of the detecting light, so that sensitive detecting light "cools" the sensitive ring cavity. Since the sensitive ring cavity (4) has a mechanical vibration with the same frequency, Stokes and anti-Stokes scattering phenomena occur in the detecting light, which modulates a detecting light field inside the sensitive ring cavity (4), where a modulation amount of the detecting light is also reflected in outputted light information.

Further, in a case that an external angular velocity $\Omega$ is inputted along the Z direction, the sensitive ring cavity (4) generates a Coriolis force along the X direction, and generates a mechanical vibration along the X direction under the force, that is, the sensitive ring cavity (4) generates a gyroscope vibration along the X direction. Information of the mechanical vibration is proportional to the inputted external angular velocity $\Omega$, and angular velocity sensing information is obtained by detecting a Coriolis vibration of the sensitive ring cavity along the X direction. in the case that the inputted angular velocity is $\Omega$, the mechanical vibration of the sensitive ring cavity (4) along the X direction will also cause a modulation of the detecting light field, resulting in Stokes and anti-Stokes scattering phenomena, where light modulation herein is caused by a gyroscope Coriolis vibration and is also reflected in the outputted light information.

The advantages and beneficial effects of the present disclosure are as follows.

Based on the principle of angular velocity sensitive structures in the conventional Coriolis vibratory gyroscopes, the present disclosure innovatively designs a light-stimulated resonant cavity and a separate dual-ring Coriolis vibration detecting resonant cavity, to solve the problem that the output signal-to-noise ratio of the gyroscope is affected by mechanical gain. This kind of self-adaptive optomechanical vibration can theoretically greatly improve the long-term stability of the drive module, so that the driving optical signals at different frequencies can all obtain stable high sensitivity, and an inertial parameter method with both high precision and high bandwidth becomes a possibility. A full-optical sensing method for realizing driving, detecting and sending of the vibratory gyroscope by using the cavity optomechanical technology is proposed, solving the problems of low precision and difficult noise suppression troubling the Coriolis vibratory gyroscope for a long time, which can greatly reduce the limitation of electronic circuit driving, improve device resolution and sensitivity, effectively suppress noises and meet high sensitivity measurement requirements. The present disclosure also reasonably circumvents stability degradation of various parameters in traditional optical gyroscopes, and gives full play to the theoretically inherent advantages of structural simplicity and easy realization of the Coriolis vibratory gyroscope.

DETAILED DESCRIPTION OF EMBODIMENTS

Figure 1:
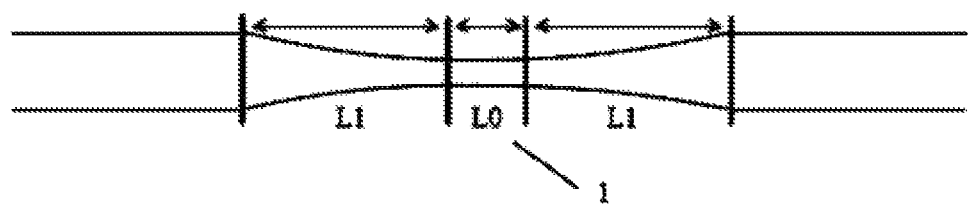
FIG. 1 shows a schematic diagram of a tapered micro-nano optical fiber according to a preferred embodiment of the present disclosure, where L1 is a transition zone of the tapered micro-nano optical fiber, and L0 is a uniform zone of the tapered fiber, for coupling with a driving ring cavity and a sensitive ring cavity.

The technical solutions according to the embodiments of the present disclosure will be described clearly and in detail below in conjunction with the drawings in the embodiments of the present disclosure. The described embodiments are only some of the embodiments of the present disclosure.

The technical solutions according to the present disclosure to address the above technical issues are the following.

A core structure of a cavity optomechanical vibratory gyroscope includes a driving micro-nano optical fiber 1, a driving ring cavity 2, a connecting structure 3, a sensitive ring cavity 4, a supporting structure 5, a base 6 and a detecting micro-nano optical fiber 7. The supporting structure 5 is provided on the base 6 and configured to connect and support the driving ring cavity 2. The driving ring cavity 2 and the sensitive ring cavity 4 are three-dimensional dual-ring resonant cavity structures and connected with each other by the connecting structure 3, the distance between which can be adjusted through the connecting structure 3. The driving micro-nano optical fiber 1 is coupled with the driving ring cavity 2; the detecting micro-nano optical fiber 7 is coupled with the sensitive ring cavity 4; the driving ring cavity 2 is a driving vibratory structure of the gyroscope; the sensitive ring cavity 4 is an angular velocity sensitive vibratory structure of the gyroscope. With a micro-scale solid-state vibratory gyroscope as the core, a dual-ring resonant cavity structure is constructed, and a micro-nano optical fiber coupling structure is integrated, for driving and detecting of the cavity optomechanical gyroscope. As for the dual-ring three-dimensional resonant cavity, the driving ring cavity and the sensitive ring cavity are connected with each other by the supporting structure, for transmitting the vibration of the driving ring to the sensitive ring; the supporting structure and base are configured for supporting the dual-ring three-dimensional structure. Light is coupled into the driving ring cavity through the micro-nano optical fiber, and a light source is tuned to generate an optical whispering gallery mode resonance inside the driving ring cavity.

A driving method for a cavity optomechanical vibratory gyroscope is provided, in which:

driving light is coupled into a driving ring cavity through a micro-nano optical fiber to generate a resonance, which is a kind of energy interaction between photons and phonons inside the cavity under specific conditions as opposed to all existing optical/electrical/magnetic single-driving methods, where precise stimulating conditions are formulated in combination with a designed structure by calculating and modeling in principle; a mechanical resonance mode of a designed ring cavity is stimulated by an appropriate optical model, to obtain expected resonance effects and achieve driving of an optomechanical vibratory gyroscope.

A detecting method for a cavity optomechanical vibratory gyroscope is provided, in which:

a vibrating ring stimulated by driving light provides the basis for the transmission of a Coriolis vibration to a sensitive ring; different from driving stimulation, external angular velocity information is transmitted through a Coriolis mechanical vibration and then detected in a detecting loop, which requires an analysis to find modulation information of a mechanical vibration inside a cavity so as to solve, in combination with a relationship between inputted angular velocity and Coriolis vibration, for an inputted external angular velocity.

A first embodiment provides a resonant structure design for a novel cavity optomechanical vibratory gyroscope.

Figure 2:
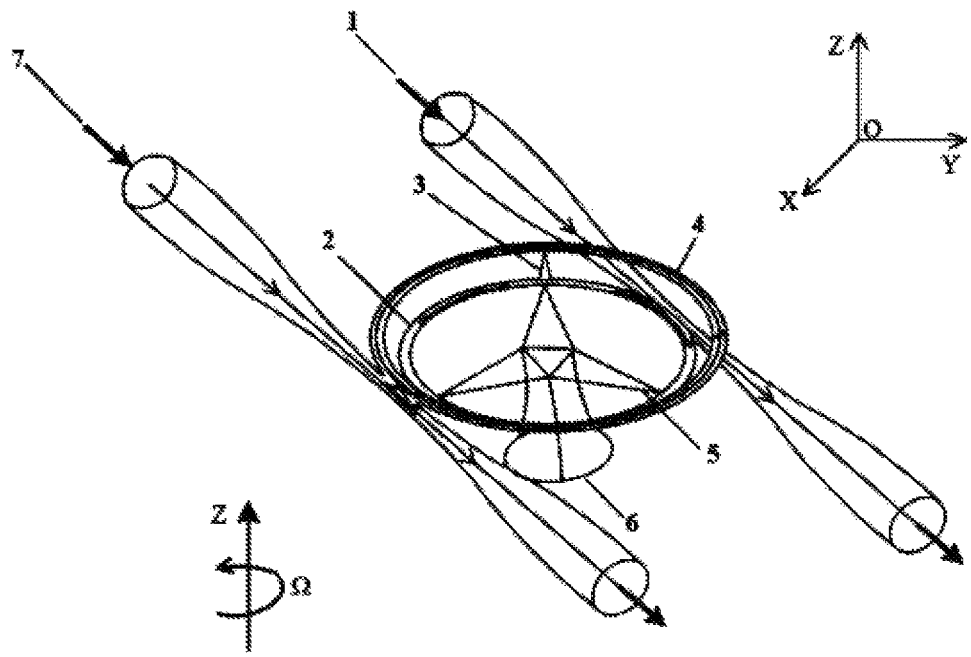
FIG. 2 shows a schematic diagram of a three-dimensional dual-ring resonant cavity structure, i.e., the core structure for driving and detecting of a gyroscope.

A unique dual-ring resonant cavity structure is adopted as the core structure of a novel cavity optomechanical Coriolis vibratory gyroscope according to the present disclosure, as shown in FIG. 2, which is an integrated structure and is prepared by micro-nano processing technology in the experiment. The structure includes: a base for supporting a main body; a supporting structure for supporting a driving ring cavity; (c) a connecting structure for connecting and supporting a sensitive ring cavity; (d) the driving ring cavity as a driving vibratory structure of the gyroscope; (e) the sensitive ring cavity as an angular velocity sensitive vibratory structure. In this way, the base, the supporting structure, the connecting structure, the driving ring cavity and the sensitive ring cavity are connected to form an integrated structure, which is finally fixed to a base material through the base. The driving ring cavity and the sensitive ring cavity are both stereoscopic structures and the distance between them can be adjusted through the connecting structure.

A second embodiment provides a driving principle and a detecting method for a novel cavity optomechanical vibratory gyroscope.

Further, the coupling between light and a ring resonant cavity structure is resolved by a micro-nano optical fiber, as shown in FIG. 2, and driving and detecting of the cavity optomechanical vibratory gyroscope are achieved.

Optical driving: the optomechanical effect is the mutual coupling between phonons and photons inside a cavity; and according to a resonant frequency of the driving ring cavity, a wavelength of the driving light (pump laser) is selected to be "blue detuned" to transfer energy from photons to phonons, to achieve stimulated amplification of mechanical vibration phonons, which is similar to stimulated Stokes scattering. First, a coupling distance between the micro-nano optical fiber and the driving ring cavity is adjusted to achieve optimal coupling; then, the pump laser is coupled into the driving ring cavity through an evanescent field of the micro-nano optical fiber and forms an optical WGM resonance in the driving ring cavity; finally, different mechanical vibrations of the driving ring cavity are stimulated by selecting different WGM resonance modes, to achieve an optomechanical effect inside the drive ring cavity to fulfill an optical driving manner of a novel optomechanical Coriolis vibratory gyroscope.

Optical detecting: FIG. 2 illustrates the principles for detecting a Coriolis vibration in the gyroscope. A micro-nano optical fiber is used to couple the sensitive ring cavity to form a WGM resonance inside the cavity. A micro-nano optical fiber is also used to transmit an optical mode and mechanical resonance information in the cavity. A wavelength of sensitive light (pump laser) is selected to be "red detuned", to transfer energy from phonons to photons for cooling, which further reduces the interference by Brownian thermal noises inside the sensitive ring cavity.

First, a unique dual-ring resonant cavity structure is adopted, and the driving light is coupled into the driving ring resonant cavity through the micro-nano optical fiber to form a WGM resonance. The optomechanical effect inside the driving ring cavity is stimulated by adjusting a wavelength of the inputted driving light, to enable it with a mechanical resonance along a Y direction, that is, a driving mode of the vibratory gyroscope is achieved and a frequency of the mechanical resonance is $\omega_{dy}$, as shown in FIG. 2.

Further, the connecting structure is also a mechanical transmission structure, transferring the mechanical resonance of the driving ring cavity to the sensitive ring cavity, by which the sensitive ring cavity generates a mechanical vibration with the same frequency $\omega_{dy}$ along the Y direction as the driving ring cavity. The two following cases are considered.

In a first case, there is no external angular velocity input.

The detecting light is coupled into the sensitive ring cavity through the micro-nano optical fiber, and in this case, a frequency of input light is selected to be lower than a resonance frequency of the sensitive ring cavity, so that phonons of the sensitive ring cavity transfer energy to photons of the detecting light. In this way, sensitive detecting light "cools" the sensitive ring cavity and reduces the thermal Brownian motion of the sensitive ring cavity itself, thereby reducing the noise interference and improving the detection precision. In this case, the sensitive ring cavity has the mechanical vibration with the same frequency, which causes Stokes and anti-Stokes scattering phenomena to occur in the detecting light, thereby modulating a detecting light field inside the sensitive ring cavity, where a modulation amount of the detecting light is also reflected in outputted light information.

In a second case, an external angular velocity $\Omega$ is inputted.

Since the sensitive ring cavity has a mechanical vibration with same frequency as the driving ring cavity along the Y direction, as shown in FIG. 2, the sensitive ring cavity generates a Coriolis force along the X direction and generates a mechanical vibration along the X direction under the force in a case the external angular velocity $\Omega$ is inputted along a Z direction, as shown in FIG. 2. That is, the sensitive ring cavity generates a gyroscope vibration along the X direction, mechanical vibration information of which is proportional to the inputted external angular velocity Ω. In this way, angular velocity sensing information can be obtained by detecting the Coriolis vibration of the sensitive ring cavity along the X direction.

In the case that the inputted angular velocity is Ω, the mechanical vibration of the sensitive ring cavity along the X direction also causes a modulation of the detecting light field, resulting in Stokes and anti-Stokes scattering phenomena, where light modulation herein is caused by a gyroscope Coriolis vibration and is also reflected in the outputted light information.

In summary, when an angular velocity Ω is inputted, the above two cases occur at the same time. In this case, the detecting light coupled into the sensitive ring cavity by the micro-nano optical fiber is modulated by two mechanical vibrations respectively in the X and Y directions. In the Y direction, the mechanical vibration transmitted from the driving ring cavity to the sensitive ring cavity modulates the detecting light; in the X direction, a Coriolis mechanical vibration of the sensitive ring cavity caused by the Coriolis force modulates the detecting light. The amount of modulation of the detecting light caused by the Coriolis vibration can be obtained by demodulating modulation information detected by the pair of these two mechanical vibrations, and further, the angular velocity Ω can be calculated according to a relationship between inputted external angular velocity Ω and Coriolis vibration.

The above embodiments are intended to explain the present disclosure and shall not be interpreted as a limitation on this disclosure. After reading the specification of the present disclosure, technical personnel can make various changes or modifications to the present disclosure, and these equivalent changes and modifications also fall within the scope defined by the claims of the present disclosure.

The invention claimed is:

1. A cavity optomechanical vibratory gyroscope, comprising:
    a driving micro-nano optical fiber (1), a driving ring cavity (2), a connecting structure (3), a sensitive ring cavity (4), a supporting structure (5), a base (6) and a detecting micro-nano optical fiber (7),
    wherein the supporting structure (5) is provided on the base (6), and configured to be connected to and support the driving ring cavity (2);
    the driving ring cavity (2) and the sensitive ring cavity (4) are three-dimensional dual-ring resonant cavity structures and are connected with each other by the connecting structure (3), and a distance between the driving ring cavity (2) and the sensitive ring cavity (4) is adjustable through the connecting structure (3);
    the driving micro-nano optical fiber (1) is coupled with the driving ring cavity (2), the detecting micro-nano optical fiber (7) is coupled with the sensitive ring cavity (4), the driving ring cavity (2) is a driving vibratory structure of the gyroscope, and the sensitive ring cavity (4) is an angular velocity sensitive vibratory structure of the gyroscope;
    the driving micro-nano optical fiber (1) is configured to couple driving light into the driving ring cavity (2), and the driving ring cavity (2) is configured to generate a whispering gallery mode (WGM) resonance with an optical signal meeting a resonance condition;
    the connecting structure (3) is configured to transmit a vibration of the driving ring cavity (2) to the sensitive ring cavity (4), and the sensitive ring cavity (4) is configured to receive a to-be-detected angular velocity $\Omega_z$ input along a Z-axis direction, the Z-axis direction being perpendicular to a plane comprising a centerline of the sensitive ring cavity (4), whereby the sensitive ring cavity (4) generates a Coriolis force along an X direction and generates a mechanical vibration along the X direction under the Coriolis force; and
    light from the sensitive ring cavity (4) is coupled into the detecting micro-nano optical fiber (7) for optical detecting.

2. The cavity optomechanical vibratory gyroscope according to claim 1, wherein the supporting structure (5) is triangular.

3. The cavity optomechanical vibratory gyroscope according to claim 1, wherein the driving ring cavity (2) and the sensitive ring cavity (4) are made of SiN and $SiO_2$ materials by using micro-nano processing technology, the SiN and $SiO_2$ materials grown by plasma enhanced chemical vapor deposition (PECVD).

4. The cavity optomechanical vibratory gyroscope according to claim 1, wherein the driving micro-nano optical fiber (1) is configured to couple the driving light into the driving ring cavity (2) through an evanescent field of the driving micro-nano optical fiber (1), to form an optical WGM resonance in the driving ring cavity (2), and
    different mechanical vibrations of the driving ring cavity (2) correspond to different WGM resonance modes.

5. The cavity optomechanical vibratory gyroscope according to claim 1, wherein the driving ring cavity (2) is configured to generate a mechanical resonance along a Y direction under an optomechnical effect stimulated at a corresponding wavelength of the inputted driving light, wherein a frequency of the mechanical resonance is $\omega_{dy}$.

6. The cavity optomechanical vibratory gyroscope according to claim 5, wherein the connecting structure (3) is made of a SiN material and transmits, as a mechanical transmission structure, the mechanical resonance of the driving ring cavity (2) to the sensitive ring cavity (4), whereby the sensitive ring cavity (4) generates a mechanical vibration with the same frequency $\omega_{dy}$ along the Y direction as the mechanical resonance in the driving ring cavity (2).

7. The cavity optomechanical vibratory gyroscope according to claim 6,
    wherein the detecting micro-nano optical fiber (7) is configured to couple detecting light into the sensitive ring cavity (4), and a frequency of the detecting light is lower than a resonance frequency of the sensitive ring cavity (4); and
    wherein the sensitive ring cavity (4) is configured to modulate the detecting light inside the sensitive ring cavity (4) by the mechanical vibration of the sensitive ring cavity (4) along the Y direction, and a modulation amount of the detecting light is reflected in outputted light information.

8. The cavity optomechanical vibratory gyroscope according to claim 7,
    wherein the mechanical vibration of the sensitive ring cavity (4) along the X direction is a gyroscope vibration and information of the mechanical vibration along the X direction is proportional to the to-be-detected angular velocity $\Omega_z$;
    wherein the outputted light information further comprises information of modulation by the mechanical vibration along the X direction on the detecting light.

9. The cavity optomechanical vibratory gyroscope according to claim 1, wherein the driving light is pump laser.

* * * * *